US008607337B2

(12) United States Patent
Yuan

(10) Patent No.: US 8,607,337 B2
(45) Date of Patent: Dec. 10, 2013

(54) SCANNING CIRCUIT AND METHOD FOR DATA CONTENT

(75) Inventor: Kuo-Hua Yuan, Kaohsiung (TW)

(73) Assignee: Realtek Semiconductor Corp., Hsinchu (TW)

( * ) Notice: Subject to any disclaimer, the term of this patent is extended or adjusted under 35 U.S.C. 154(b) by 743 days.

(21) Appl. No.: 12/244,222

(22) Filed: Oct. 2, 2008

(65) Prior Publication Data

US 2009/0094696 A1    Apr. 9, 2009

(30) Foreign Application Priority Data

Oct. 5, 2007  (TW) ............................. 96137471 A

(51) Int. Cl.
*G06F 12/14*      (2006.01)
*G06F 11/00*      (2006.01)
(52) U.S. Cl.
USPC ............... 726/22; 726/13; 707/708; 711/100; 714/722; 714/726
(58) Field of Classification Search
USPC ............ 726/11, 13, 14, 22–25; 711/217, 100; 714/710, 719, 722, 726; 707/708
See application file for complete search history.

(56) References Cited

U.S. PATENT DOCUMENTS

| 6,105,079 | A * | 8/2000 | Kuo et al. ..................... 710/25 |
| 6,629,275 | B1 * | 9/2003 | Pendurkar et al. ............ 714/726 |
| 6,778,984 | B1 * | 8/2004 | Lu et al. ............................ 1/1 |
| 7,251,634 | B1 * | 7/2007 | Foss et al. ........................ 705/64 |
| 7,454,418 | B1 * | 11/2008 | Wang ...................................... 1/1 |
| 7,603,376 | B1 * | 10/2009 | Narayanaswamy ................. 1/1 |
| 8,363,713 | B2 * | 1/2013 | Chuang .................... 375/240.01 |
| 2003/0014517 | A1 * | 1/2003 | Lindsay et al. ................ 709/224 |
| 2003/0163637 | A1 * | 8/2003 | Villaret et al. ................ 711/108 |
| 2003/0217046 | A1 * | 11/2003 | Yuan et al. ........................ 707/3 |
| 2005/0063421 | A1 * | 3/2005 | Wan et al. ........................ 370/509 |
| 2005/0114337 | A1 * | 5/2005 | Lunteren ............................ 707/9 |
| 2005/0234915 | A1 * | 10/2005 | Ricciulli ......................... 707/10 |
| 2006/0041725 | A1 * | 2/2006 | Lakshmanamurthy et al. ............................. 711/154 |
| 2006/0156122 | A1 * | 7/2006 | Wang et al. .................... 714/726 |
| 2006/0224828 | A1 * | 10/2006 | Chen et al. ..................... 711/117 |
| 2007/0169184 | A1 * | 7/2007 | Krywaniuk ..................... 726/11 |
| 2007/0283126 | A1 * | 12/2007 | Lo et al. ........................ 711/217 |
| 2008/0010570 | A1 * | 1/2008 | Yamazaki ..................... 714/726 |
| 2008/0133989 | A1 * | 6/2008 | Hayashi et al. ............... 714/726 |
| 2008/0201772 | A1 * | 8/2008 | Mondaeev et al. ............. 726/13 |

FOREIGN PATENT DOCUMENTS

TW    I272486 B    2/2007

* cited by examiner

*Primary Examiner* — David García Cervetti
*Assistant Examiner* — Shanto M Abedin
(74) *Attorney, Agent, or Firm* — McClure, Qualey & Rodack, LLP

(57) ABSTRACT

The present invention relates to a data scanning circuit and method. According to the present invention, a memory circuit stores a plurality of codes. Each of the code corresponds to a sub-rule. The memory circuit outputs at least first bit and at least second bit of each code, respectively, according to a first and a second data items. An operational circuit performs logic operations on the first and second bits, and produces an operated result. A decision circuit decides whether the input data satisfies the scanning rule according to the operated result.

19 Claims, 4 Drawing Sheets

SCANNING CIRCUIT AND METHOD FOR DATA CONTENT

FIELD OF THE INVENTION

The present invention relates generally to a scanning circuit for data content, and particularly to a scanning circuit and method for network data content.

BACKGROUND OF THE INVENTION

Currently, computer technologies are developing increasingly. The transmission rate and bandwidth are increasing with the progress of technologies. Accordingly, the transmitted data flow increases as well. In the transmitted data, computer viruses or advertisement web pages can be included, delaying the system processing speed or even poisoning the system and thus making the system abnormal. Thereby, in many applications of modern systems, for example, web switches, load balancers, and virus protection, the data content will be examined one by one for preventing the problems described above. This is so-called content scanning.

FIG. 1 shows a scanning circuit for data content according to the prior art. As shown in the figure, a scanning circuit 10' comprises a plurality of comparators 20'. Since the location of the content in the packet data to be searched is uncertain, the plurality of comparators 20' has to scan all content of said packet data one by one for ensuring that no scanning loss occurs. As shown in FIG. 1, after comparing the first to the fifth bytes of the packet data, the second to the sixth bytes are compared subsequently. Thereby, the second to the fifth bytes are usually cached for next comparison. In addition, since the scanning circuit is applied extensively and the guidelines of categorization for various applications differ, the length of each rule varies accordingly. For example, when the number of rules to be scanned is 10, the shortest length thereof might be two to three bytes only, while the longest might be tens of byte. In order to solve the problem of rules with different lengths, the size of rules is set fixed. If a shorter rule is to be set, a mask 22' is adopted, and the comparator 20' is used for deciding whether the data to be scanned is satisfied. Hence, extra cache space is wasted for comparison, and the implementation circuits are relatively complicated. Besides, for longer rules, a larger cache space is needed.

Accordingly, the present invention provides a scanning circuit and method for data content, which can save circuit area and dynamically configure the length of scanning rules. Thereby, scanning flexibility is enhanced and scanning time is shortened.

SUMMARY

An objective of the present invention is to provide a data scanning circuit and method, which can scan if part of input data satisfies the scanning rules for reducing circuit complexity, saving costs, and enhancing scanning efficiency.

Another objective of the present invention is to provide a data scanning circuit and method, which can configure dynamically the length of scanning rules for enhancing scanning flexibility.

Still another objective of the present invention is to provide a data scanning circuit and method, which can find out the location of the data satisfying the scanning rules in the input data.

The data scanning circuit and method comprises a memory circuit, an operational circuit, and a decision circuit. The memory circuit stores a plurality of codes. Each of the code corresponds to a sub-rule. The memory circuit outputs at least first bit and at least second bit of each code, respectively, according to a first and a second data items. An operational circuit performs logic operations on the first and second bits, and produces an operated result. A decision circuit decides whether the input data satisfies the predetermined scanning rule according to the operated result.

DETAILED DESCRIPTION

In order to make the structure and characteristics as well as the effectiveness of the present invention to be further understood and recognized, the detailed description of the present invention is provided as follows along with preferred embodiments and accompanying figures.

Figure 1:
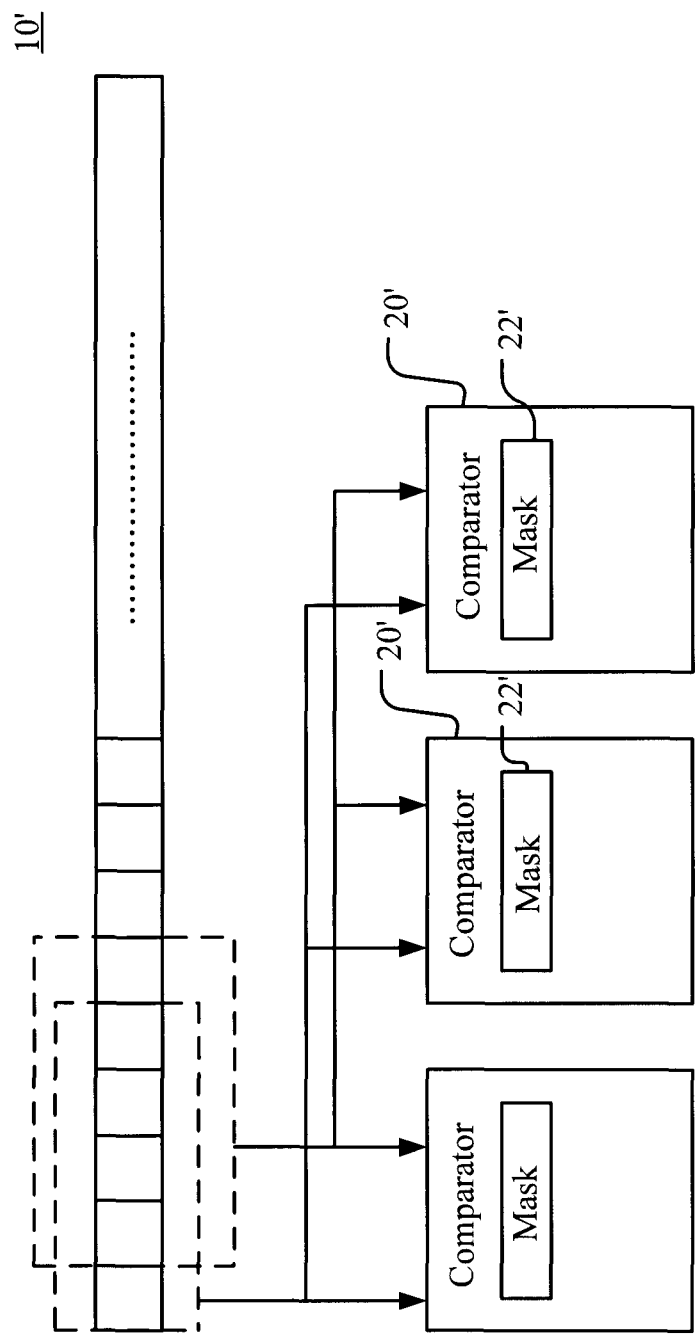
FIG. 1 shows a data scanning circuit according to the prior art.
Figure 2:
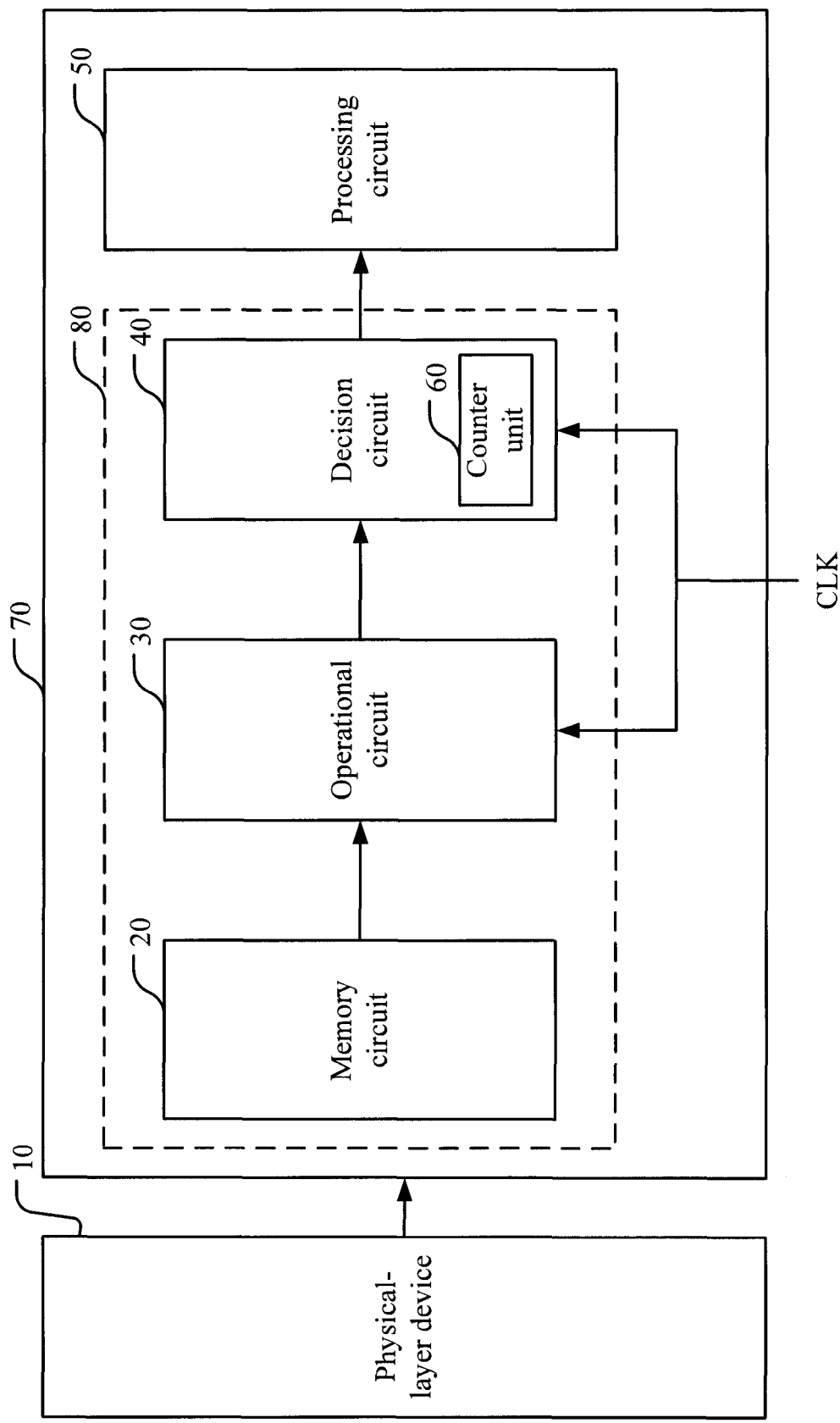
FIG. 2 shows a block diagram according to a preferred embodiment of the present invention.
Figure 3:
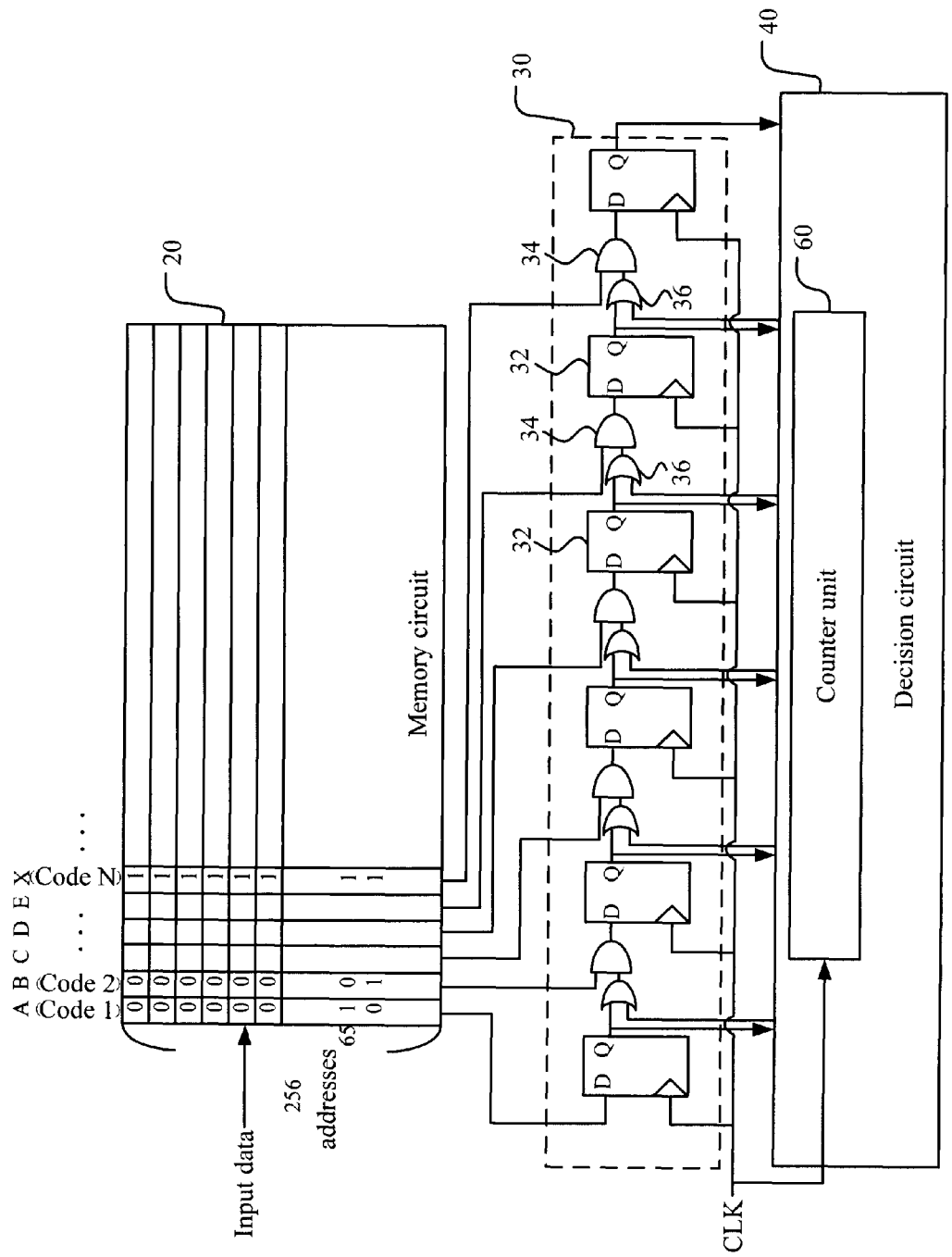
FIG. 3 shows a circuit diagram according to a preferred embodiment of the present invention.

FIG. 2 and FIG. 3 show a block diagram and a circuit diagram according to a preferred embodiment of the present invention, respectively. As shown in the figures, the present preferred embodiment is applied to the Internet for scanning the packet data of the network such as a web switch or a load balancer. However, the present invention is not limited to be applied to the Internet. The present preferred embodiment comprises a physical-layer (PHY) device 10 and a media access controller (MAC) 70. The media access controller 70 includes a data scanning circuit 80 and a processing circuit 50. The data scanning circuit 80 further includes a memory circuit 20, an operational circuit 30, and a decision circuit 40. The physical-layer device 10 receives input data, which includes a plurality of data items. Since the present preferred embodiment is applied to the Internet, the input data is a packet data of the Internet.

The memory circuit 20 stores a plurality of codes. Each of the codes corresponds to or represents a sub-rule. For example, the sub-rule is the character "A" or the symbol "@" ... etc. Each code has N bits. Each bit of each code is distributed to a different address of the memory circuit 20, and N-1 bits of the code correspond to the same logic value. In addition, each code is programmable for the users to perform configuration.

In the following, an example is taken for description. The scanning rule is to search whether the input data includes "ABCDE", which comprises five sub-rules. The first sub-rule "A" corresponds to the America Standard Code for Information Interchange (ASCII Code) 65. Thereby, in the memory circuit 20, the storage address 65 for storing the first code is set "1", while the bits of the other addresses (addresses 0.about.64 and 66.about.255) are set "0". In addition, the second sub-rule corresponds to the ASCII Code 66, and in the memory circuit 20, the storage address 66 for storing the second code is set "1", while the bits of the other addresses (addresses 0.about.65 and 67.about.255) are set "0". Similar sub-rules apply to the scanning data "CDE". The corresponding bits of the "don't care" data beyond the scanning rules are set "1". For example, as shown in FIG. 3, the data item X is the sixth data item. Hence, all addresses of the sixth part are set "1". Since a byte is used as the unit according to the present preferred embodiment and a byte has 256 combinations, the depth of the memory circuit 20 of the present preferred embodiment is 256. That is, there are 256 addresses. The width thereof depends on the requirement of the scanning rules, which means that the stored bit of each address depends on the scanning requirement.

Besides, the plurality of input data items received by the physical-layer device 10 is transmitted to the memory circuit 20 as the read addresses. Thereby, the memory circuit 20 will read out the data according to the plurality of input data items. That is, the input data items are inputted to the address port of the memory circuit 20 so that the memory circuit 20 can output at least one bit of each code according to the input data. Taking FIG. 3 as an example, if the first data item of the input data received by the memory circuit 20 is "A", since "A" corresponds to the storage address 65 of the memory circuit 20, the memory circuit 20 will output a first output data, which is the data stored in the storage address 65 of the memory circuit 20. In the present preferred embodiment, the memory circuit 20 will output the output data of "10000". If the second data item of the input data is "B", the memory circuit 20, likewise, will output a second output data of the storage address 66, which is "01000". A preferred embodiment of the memory circuit 20 is a static random access memory (SRAM).

The operational circuit 30 receives the first output data outputted by the memory circuit 20, shifts the first output data outputted by the memory circuit 20 according to a clock signal CLK, and performs logic operations with the second output data outputted by the memory circuit 20 to produce an operated result to the decision circuit 40. In the following description, FIG. 3 is used to describe the operational circuit 30. As shown in FIG. 3, the operational circuit 30 comprises a plurality of flip-flops 32 and a plurality of logic units 34. According to the present preferred embodiment, the logic units 34 are AND gates. The flip-flops 32 are coupled in series with each other. The logic units 34 are coupled between the flip-flops 32, respectively, for performing the logic operation on the plurality of output data outputted by the memory circuit 20 and outputting the operated data to the coupled flip-flops 32. The plurality of flip-flops 32 buffer the operated data from the logic units 34 and output the operated results to the decision circuit 40 according to the clock signal CLK.

In the following, the scanning data "ABCDE" is used for detailed description. After the memory circuit 20 receives the input data, if the input data includes "ABODE", then the memory circuit 20 will output sequentially the output data "10000", "01000", "00100", "00010", and "00001". That is to say, the flip-flops 32 of the operational circuit 30 will respectively receive the first output data "10000" and shift the output data according to the clock signal CLK to the logic units 34. The logic units 34 will perform logic operations while receiving the next output data, and output to the flip-flops 32. According to the present preferred embodiment, at the present moment, the data received by the second flip-flop 32 is logic "1", and the data will be shifted and be outputted according to the clock signal CLK to the logic units 34 connected serially in the next stage. However, if the second data is "C" but not "B", the second output data outputted by the memory circuit 20 will be "00100". Then, the data received by the second flip-flop 32 of the operational circuit 30 is logic "0", which means the input data does not comply with the scanning rules. That is, if the output data sequentially received by the operational circuit 30 satisfies the scanning rules, the function of the operational circuit 30 behaves like a shift register, which shifts the first operated data "1" to next stage.

Accordingly, when the input data includes "ABCDE", the logic "1" in the first operated data will appear in the output operated result of the fifth flip-flop 32 after shifting by five clock signals CLK, which means part of the data items in the input data satisfies the scanning rules "ABCDE". Thereby, if the output operated result of the fifth flip-flop 32 is "0", it means that there is no data in the input data satisfying the rules "ABCDE". It is well known to the person skilled in the art that the clock signal CLK described above can be provided by an external or an internal circuit, thereby further description is omitted for sake of brevity.

The decision circuit 40 receives the operated results to decide the logic data for knowing whether part of the input data complies with the scanning rule. According to the present preferred embodiment, the output operated result of the fifth flip-flop 32 of the operational circuit 30 is logic "1", it means that part of the data items in the input data satisfies the scanning rules. When the decision circuit 40 decides that the input data received by the physical-layer device 10 includes data satisfying the scanning rules, a control signal will be transmitted to the processing circuit 50. The processing circuit 50 receives the control signal and executes relevant actions. For example, when the decision circuit 40 compares the packet data of the Internet and finds agreement with the scanning rules, the processing unit 50 can block web pages from being opened or can prevent attacks from viruses.

According to the present invention, the memory circuit 20 stores a plurality of codes representing a scanning rule, wherein each code represents a sub-rule. It is noticed that the input data is inputted into the address port of the memory circuit 20. In addition, the memory circuit 20 outputs the corresponding output data according to the input data items of input data, and the operational circuit 30 produces the operated results according to the output data outputted by the memory circuit 20. Afterwards, the decision circuit 40 decides whether the input data includes the data satisfying the scanning rules according to the operated results. By this invention, the circuit complexity can be reduced, and hence the cost can be reduced accordingly and the scanning efficiency can be improved. Besides, the decision circuit 40 can configure arbitrarily which output of the flip-flops 32 is to be used as the logic data for performing decision. Thus, the present invention is flexible and convenient.

Moreover, the decision circuit 40 further includes a counter unit 60, used for counting the clock signal CLK. When the decision circuit 40 decides that partial data of the input data satisfies the scanning rules, the counting result of the counter unit 60 can be used for finding out the location of the data item satisfying the scanning rules in the input data for convenient further processing. According to a preferred embodiment of the present invention, the counter unit 60 can be set in the decision circuit 40. However, it is not limited to be set therein.

Please refer again to FIG. 3. Since all of the flip-flops 32 of the operational circuit 30 according to the present preferred embodiment are connected in series, the operational circuit 30 has to be isolated while performing logic operations of different scanning rules for avoiding influence of the result of the previous scanning rule on that of the next one. The present invention further includes a plurality of isolation units 36. According to the present invention, the isolation units 36 can be OR gates. The isolation units 36 are set between two flip-flops 32, and are coupled to the flip-flop 32 of the previous stage and to the logic units 34 between two flip-flops 32. The isolation units 36 are used for receiving an isolation signal for isolating the next scanning rule, wherein the isolating signal can be transmitted by the decision circuit 40 or by an external circuit. If the first scanning rule includes five scanning data items, that is, the fifth and the sixth flip-flops 32 have to be isolated from each other, then the decision circuit 40 transmits the isolation signal to the isolation unit 36 set between the fifth and the sixth flip-flops 32. According to the present preferred embodiment, the isolation signal is logic "1". Thereby, no matter the output of the fifth flip-flop 32 is logic "1" or logic "0", the output of the isolation unit 36 remains logic "1". The output of the logic unit 34 between the fifth and the sixth flip-flops 32 depends on the first data item of the next scanning rule. That is to say, the data received by the sixth flip-flop 32 is the data of the next scanning rule. Hence, the fifth and the sixth flip-flops 32 are isolated for isolating effectively the scanning rules.

The decision circuit 40 can configure the isolation unit 36 according to the size of the scanning rules. Thereby, the length of the scanning rules can be configured dynamically and the flexibility is increased. According to the present preferred embodiment, for saving cost, the operational circuit 30 can set the isolation unit 36 by a fixed spacing, for example, by a multiple of 4 or 6. Hence, the circuit complexity and cost are reduced. Furthermore, if the plurality of scanning data items of the scanning rules is fewer than the number of the set fixed spacing, the excess bits are "don't care" bits, and are set "1". For example, when setting the isolation units 36 by a multiple of 6, if the scanning data items of the scanning rules is fewer than 6 bits, the excess bits are set "1" ("don't care").

Figure 4:
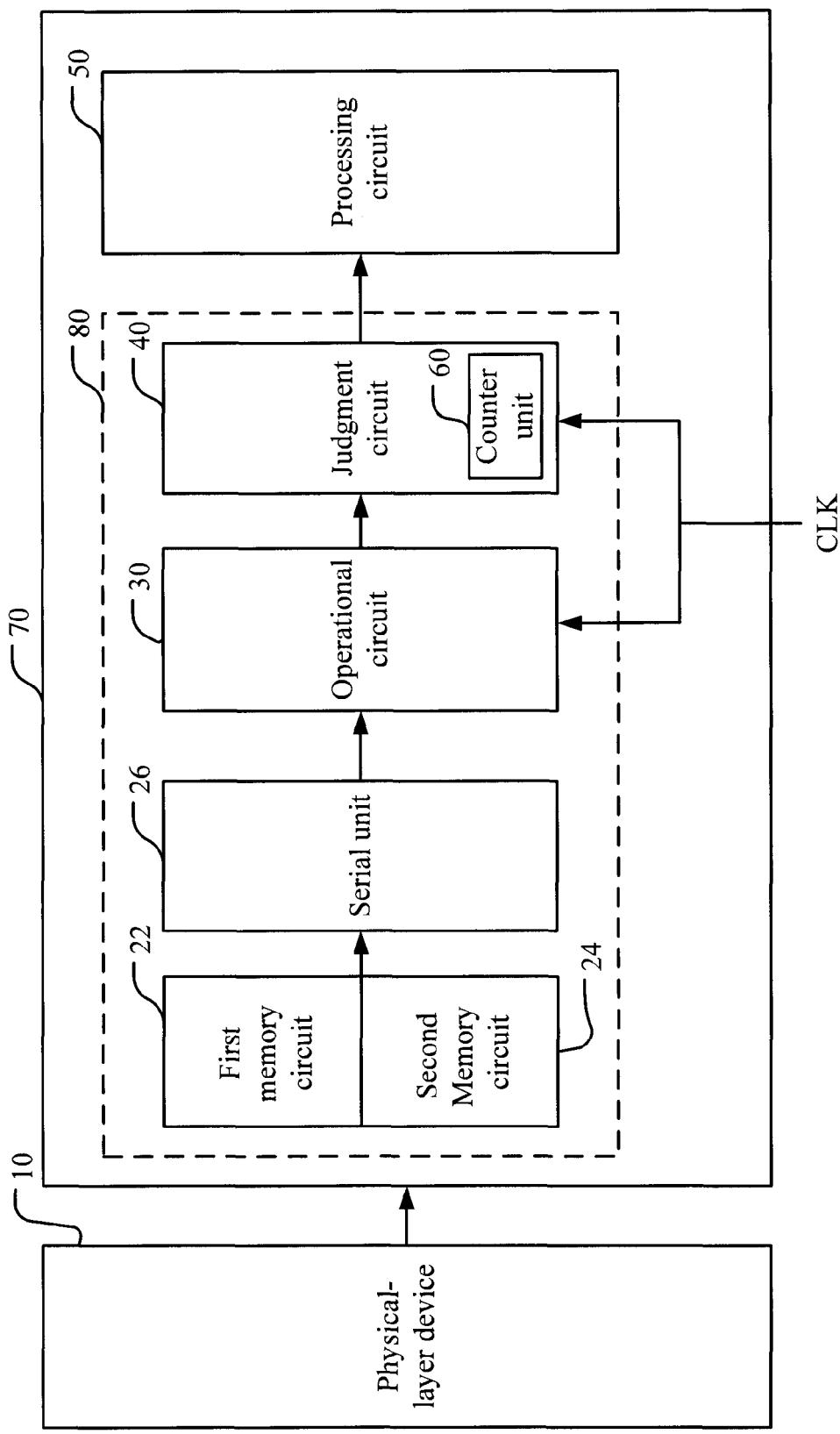
FIG. 4 shows a block diagram according to another preferred embodiment of the present invention.

FIG. 4 shows a block diagram according to another preferred embodiment of the present invention. As shown in the figure, the difference between the present preferred embodiment and the one in FIG. 2 is that, in FIG. 2, only one memory circuit 20 is used, while in the present preferred embodiment, a first memory circuit 22 and a second memory circuit 24 are used. The memory capacity of the first and second memory circuits 22, 24 is smaller than that of the memory circuit 20. Thereby, the memory capacity can be reduced and hence reducing the consumed area. If one byte (8 bits) is divided into two 4 bits, the code representing a sub-rule only needs 2^4× 2=32 bits. That is to say, only the first and second memory circuits 22, 24 with depth 16 are needed to replace the memory circuit 20 in FIG. 2. Thereby, the capacity of the memory circuits 22, 24 is much smaller in comparison with the capacity of the memory circuit 20. Consequently, the consumed area of the memory circuit is saved.

Moreover, the scanning circuit according to the present preferred embodiment further includes a serial unit 26. The input terminals of the serial unit 26 are coupled to the first and second memory circuit 22, 24, respectively. When the physical-layer device 10 receives the input data, the input data is divided and is transmitted, respectively, to the corresponding first and second memory circuit 22, 24 for outputting corresponding data items, respectively. Then, the serial unit 26 serializes the output data of the first and second memory circuit 22, 24, and transmits to the operational circuit 30 for performing the same subsequent processing as FIG. 2.

To sum up, the data scanning circuit and method according to the present invention stores a plurality of codes by a memory circuit. Each of the codes represents a sub-rule. The memory circuit respectively outputs data according to the data items of input data. An operational circuit performs logic operations on the output data, and produces an operated result. A decision circuit decides whether the input data satisfies the scanning rule according to the operated result. Thereby, the circuit complexity can be saved and the cost can be reduced. In addition, the scanning efficiency and flexibility can be enhanced as well.

Accordingly, the present invention conforms to the legal requirements owing to its novelty, non-obviousness, and utility. However, the foregoing description is only a preferred embodiment of the present invention, not used to limit the scope and range of the present invention. Those equivalent changes or modifications made according to the shape, structure, feature, or spirit described in the claims of the present invention are included in the appended claims of the present invention.

The invention claimed is:

1. A data scanning circuit comprising:
a memory circuit configured to pre-store a plurality of codes that together form a rule, which, when satisfied, allows the data scanning circuit to prevent further processing of undesirable data, each code corresponding to a sub-rule and comprising plural bits, the memory circuit further configured to receive input data comprising at least a first data item and a second data item, and output a first of the plurality of codes and a second of the plurality of codes according to the first data item and the second data item, respectively, wherein the memory circuit is a static random access memory (SRAM);
an operational circuit coupled to the memory circuit, the operational circuit configured to perform logic operations on a clock-shifted version of the first code and the second code to produce an operated result, the operated result based on the clock-shifted version of the first code and the second code, the logic operations including an AND logical operation; and
a decision circuit coupled to the operational circuit, the decision circuit configured to analyze the operated result to determine whether the input data satisfies the rule.

2. The data scanning circuit of claim 1, wherein the first data and the second data are inputted to the address port of the memory circuit.

3. The data scanning circuit of claim 1, wherein the bits of each code are distributed in different addresses of the memory circuit.

4. The data scanning circuit of claim 1, wherein the first code has N bits, and N-1 bits of the first code correspond to the same logic value.

5. The data scanning circuit of claim 1, wherein the plurality of codes are programmable.

6. The data scanning circuit of claim 1, wherein the operational circuit includes:
a plurality of flip-flops; and
a plurality of logic units, respectively coupled between the plurality of flip-flops.

7. The data scanning circuit of claim 6, wherein the plurality of logic units is AND gates.

8. The data scanning circuit of claim 1, and further comprising:
a counter, used for finding out the location of the data item satisfying the rule in the input data.

9. The data scanning circuit of claim 1, wherein the first data and the second data are one byte.

10. The data scanning circuit of claim 1, wherein the sub-rule represents a character.

11. The data scanning circuit of claim 1, wherein the data scanning circuit is disposed in a media access controller.

12. A data scanning method comprising the steps of:
pre-storing a first code and a second code in a memory circuit, the first code corresponding to a first sub-rule of a rule and the second code corresponding to a second sub-rule of the rule, the first and second codes each comprising plural bits, wherein the memory circuit is a static random access memory (SRAM);
receiving input data comprising at least a first data item and a second data item;

outputting the first code according to the first data item;
outputting the second code according to the second data item;
performing logic operations that include an AND logic operation on a clock-shifted version of the first code and the second code to produce an operated result, the operated result based on the clock-shifted version of the first code and the second code; and
determining, from the operated result, whether the input data satisfies the rule, wherein satisfying the rule identifies the input data as undesirable data.

13. The data scanning method of claim 12, wherein the first data and the second data are inputted to the address port of the memory circuit.

14. The data scanning method of claim 12, wherein the bits of each code are distributed in different addresses of the memory circuit.

15. The data scanning method of claim 12, wherein the first code has N bits, and N-1 bits of the first code correspond to the same logic value.

16. The data scanning method of claim 12, wherein the plurality of codes is programmable.

17. The data scanning method of claim 12, wherein the step of performing logic operations further comprises shifting the first code according to a clock signal, and performing the logic operations with the second code to produce the operated result.

18. The data scanning method of claim 17, and further comprising counting the clock signal to find out the location of a data item satisfying the rule in the input data.

19. The data scanning method of claim 12, wherein the method is applied to a web switch or a load balancer.

* * * * *